(12) United States Patent
Ganesan et al.

(10) Patent No.: US 11,398,883 B2
(45) Date of Patent: Jul. 26, 2022

(54) RESPONDING TO A NEW DATA INDICATOR FOR A HYBRID AUTOMATIC REPEAT REQUEST PROCESS

(71) Applicant: Lenovo (Singapore) PTE. LTD., New Tech Park (SG)

(72) Inventors: Karthikeyan Ganesan, Kaiserslautern (DE); Joachim Loehr, Wiesbaden (DE); Prateek Basu Mallick, Dreieich (DE); Alexander Johann Maria Golitschek Edler von Elbwart, Darmstadt (DE); Ravi Kuchibhotla, Chicago, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 190 days.

(21) Appl. No.: 16/899,329

(22) Filed: Jun. 11, 2020

(65) Prior Publication Data

US 2020/0396024 A1 Dec. 17, 2020

Related U.S. Application Data

(60) Provisional application No. 62/860,689, filed on Jun. 12, 2019.

(51) Int. Cl.
*H04L 1/18* (2006.01)
*H04W 92/18* (2009.01)

(52) U.S. Cl.
CPC .......... *H04L 1/1812* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2019/0222394 A1* | 7/2019 | Medles | H04L 1/1854 |
| 2019/0268903 A1* | 8/2019 | Lee | H04L 5/0053 |
| 2021/0084694 A1* | 3/2021 | Selvaganapathy | H04W 80/08 |

FOREIGN PATENT DOCUMENTS

| | | |
|---|---|---|
| EP | 1852996 A2 | 11/2001 |
| EP | 2555458 A2 | 3/2011 |
| WO | 2011008049 A2 | 1/2011 |

OTHER PUBLICATIONS

Ericsson, "Reply LS to RAN2 on mode-1 retransmission indication", 3GPP TSG RAN WG1 Meeting #97 R1-1907905, May 13-17, 2019, p. 1.
Fujitsu, "Discussion on mode 1 resource allocation for NR V2X", 3GPP TSG RAN WG1 #97 R1-1906437, May 13-17, 2019, pp. 1-6.
(Continued)

*Primary Examiner* — Robert M Morlan
(74) *Attorney, Agent, or Firm* — Kunzler Bean & Adamson

(57) ABSTRACT

Apparatuses, methods, and systems are disclosed for responding to a new data indicator for a hybrid automatic repeat request process. One method includes determining whether a current new data indicator in a current sidelink grant matches a last received new data indicator in a last received sidelink grant for a first hybrid automatic repeat request process. The method includes, in response to determining that the current new data indicator does not match the last received new data indicator, determining whether a negative acknowledgement has been transmitted in response to the last received sidelink grant.

18 Claims, 13 Drawing Sheets

(56) References Cited

OTHER PUBLICATIONS

Lenovo, Motorola Mobility, "SL HARQ operation", 3GPP TSG RAN WG2 Meeting #106 R2-1906733, May 13-17, 2019, pp. 1-4.
PCT/IB2020/000471, "Notification of Transmittal of the International Search Report and the Written Opinion of the International Searching Authority, or the Declaration", PCT ISA, Nov. 16, 2020, pp. 1-15.

* cited by examiner

RESPONDING TO A NEW DATA INDICATOR FOR A HYBRID AUTOMATIC REPEAT REQUEST PROCESS

CROSS-REFERENCE TO RELATED APPLICATIONS

This application claims priority to U.S. Patent Application Ser. No. 62/860,689 entitled "APPARATUSES, METHODS, AND SYSTEMS FOR SIDELINK MODE 1 HARQ OPERATION FOR A TRANSMITTER UE" and filed on Jun. 12, 2019 for Karthikeyan Ganesan, which is incorporated herein by reference in its entirety.

FIELD

The subject matter disclosed herein relates generally to wireless communications and more particularly relates to responding to a new data indicator for a hybrid automatic repeat request process.

BACKGROUND

The following abbreviations are herewith defined, at least some of which are referred to within the following description: Third Generation Partnership Project ("3GPP"), $5^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Discontinuous Transmission ("DTX"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNS S"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), HARQ Process ID ("HPID"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDP"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, a new data indicator may be used.

BRIEF SUMMARY

Methods for responding to a new data indicator for a hybrid automatic repeat request process are disclosed. Apparatuses and systems also perform the functions of the methods. One embodiment of a method includes determining whether a current new data indicator in a current sidelink grant matches a last received new data indicator in a last received sidelink grant for a first hybrid automatic repeat request process. In some embodiments, the method includes, in response to determining that the current new data indicator does not match the last received new data indicator, determining whether a negative acknowledgement has been transmitted in response to the last received sidelink grant.

One apparatus for responding to a new data indicator for a hybrid automatic repeat request process includes a processor that: determines whether a current new data indicator in a current sidelink grant matches a last received new data indicator in a last received sidelink grant for a first hybrid automatic repeat request process; and, in response to determining that the current new data indicator does not match the last received new data indicator, determines whether a negative acknowledgement has been transmitted in response to the last received sidelink grant.

Another embodiment of a method for responding to a new data indicator for a hybrid automatic repeat request process includes determining whether a current new data indicator in a current sidelink grant matches a last received new data indicator in a last received sidelink grant for a first hybrid automatic repeat request process. In some embodiments, the method includes, in response to determining that the current new data indicator matches the last received new data indicator, determining whether a positive acknowledgement has been transmitted in response to the last received sidelink grant.

Another apparatus for responding to a new data indicator for a hybrid automatic repeat request process includes a processor that: determines whether a current new data indicator in a current sidelink grant matches a last received new data indicator in a last received sidelink grant for a first hybrid automatic repeat request process; and, in response to determining that the current new data indicator matches the last received new data indicator, determines whether a positive acknowledgement has been transmitted in response to the last received sidelink grant.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
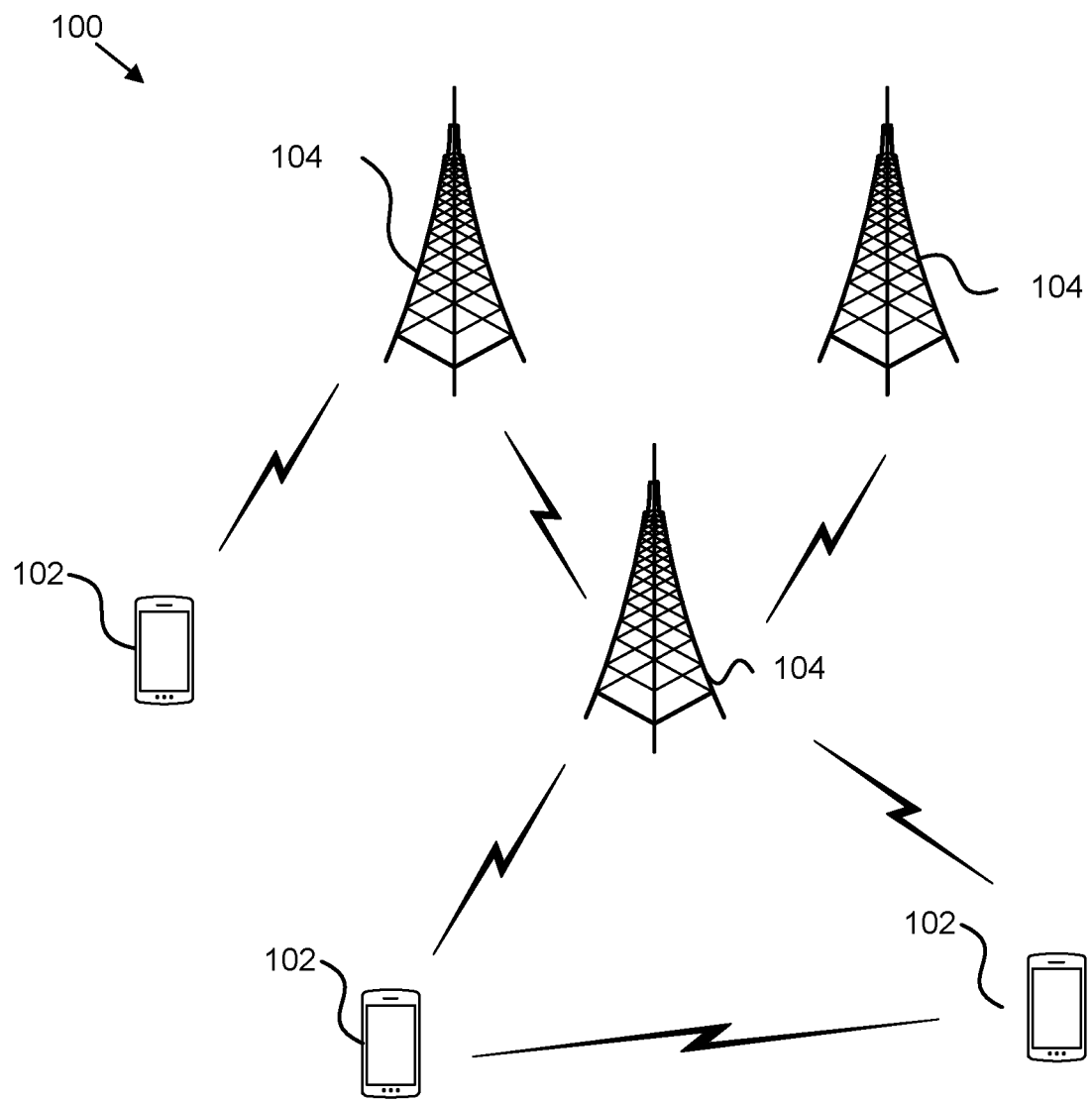
FIG. 1 is a schematic block diagram illustrating one embodiment of a wireless communication system for responding to a new data indicator for a hybrid automatic repeat request process.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for responding to a new data indicator for a hybrid automatic repeat request process. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine whether a current new data indicator in a current sidelink grant matches a last received new data indicator in a last received sidelink grant for a first hybrid automatic repeat request process. In some embodiments, the remote unit 102 may, in response to determining that the current new data indicator does not match the last received new data indicator, determine whether a negative acknowledgement has been transmitted in response to the last received sidelink grant. Accordingly, the remote unit 102 may be used for responding to a new data indicator for a hybrid automatic repeat request process.

In certain embodiments, a remote unit 102 may determine whether a current new data indicator in a current sidelink grant matches a last received new data indicator in a last received sidelink grant for a first hybrid automatic repeat request process. In some embodiments, the remote unit 102 may, in response to determining that the current new data indicator matches the last received new data indicator, determine whether a positive acknowledgement has been transmitted in response to the last received sidelink grant. Accordingly, the remote unit 102 may be used for responding to a new data indicator for a hybrid automatic repeat request process.

Figure 2:
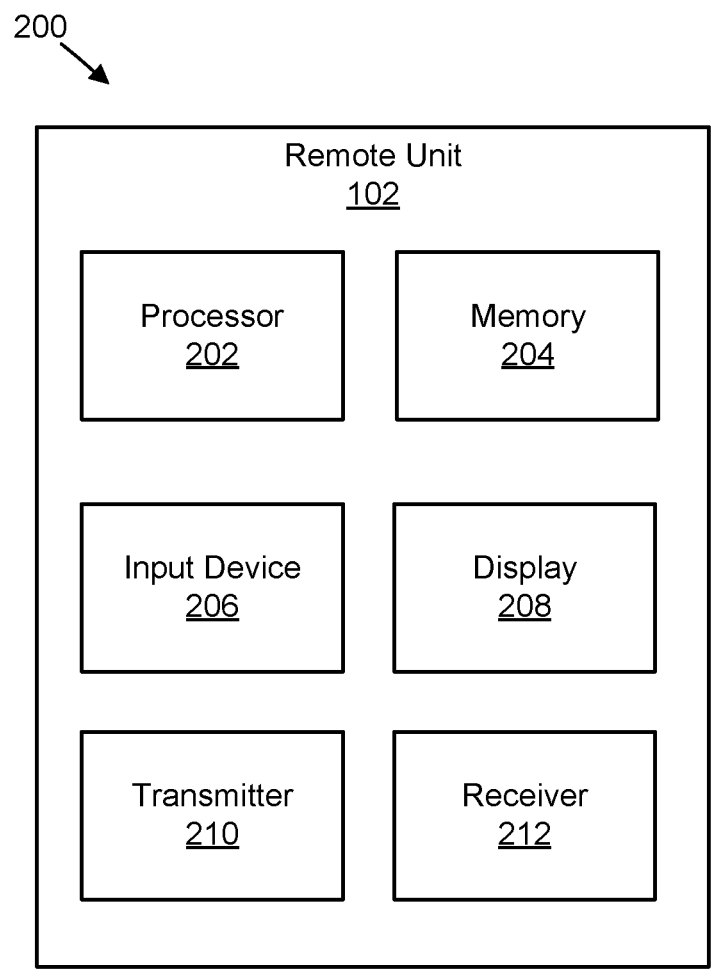
FIG. 2 is a schematic block diagram illustrating one embodiment of an apparatus that may be used for responding to a new data indicator for a hybrid automatic repeat request process.

FIG. 2 depicts one embodiment of an apparatus 200 that may be used for responding to a new data indicator for a hybrid automatic repeat request process. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In certain embodiments, the processor 202 may: determine whether a current new data indicator in a current sidelink grant matches a last received new data indicator in a last received sidelink grant for a first hybrid automatic repeat request process; and, in response to determining that the current new data indicator does not match the last received new data indicator, determine whether a negative acknowledgement has been transmitted in response to the last received sidelink grant.

In various embodiments, the processor 202 may: determine whether a current new data indicator in a current sidelink grant matches a last received new data indicator in a last received sidelink grant for a first hybrid automatic repeat request process; and, in response to determining that the current new data indicator matches the last received new data indicator, determine whether a positive acknowledgement has been transmitted in response to the last received sidelink grant.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
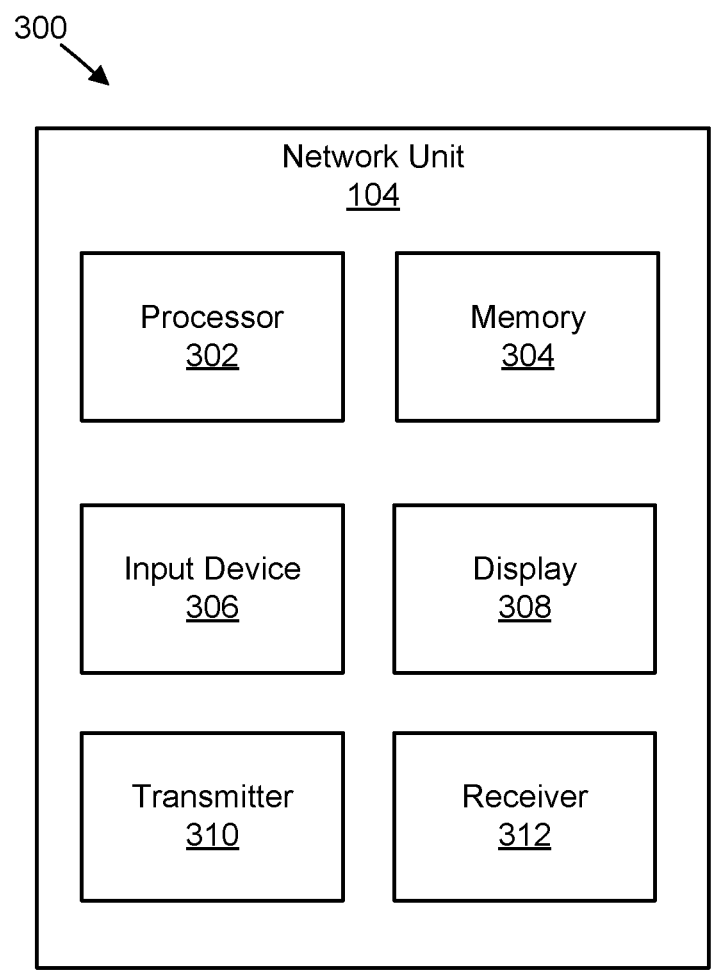
FIG. 3 is a schematic block diagram illustrating one embodiment of an apparatus that may be used for transmitting and/or receiving data.

FIG. 3 depicts one embodiment of an apparatus 300 that may be used for transmitting and/or receiving data. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 and/or the receiver 312 may transmit and/or receive information described herein. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, HARQ feedback error detection and handling mechanisms may be used for sidelink NR mode 1 operation. In such embodiments, a gNB may allocate transmission and retransmission resources for sidelink transmissions.

In various embodiments, a TX UE transmits ACK/NACK about a sidelink transmission and reception to the gNB and the gNB may not receive the ACK/NACK from the TX UE.

As used herein, the term eNB and/or gNB may be used for a base station but it may also be replaceable by any other radio access node (e.g., BS, eNB, gNB, AP, NR, and so forth). Moreover, various embodiments described herein may be in the context of 5G NR; however, such embodiments may be applicable to other mobile communication systems supporting serving cells and/or carriers configured for sidelink communication over a PC5 interface.

In certain embodiments, scheduling enhancements may be used for unicast and/or groupcast transmission by detecting errors (e.g., protocol errors due to NACK to ACK, DTX errors due to the erroneous physical layer decoding). In some embodiments, packet loss due to erroneous control channel decoding may be reduced.

Figure 4:
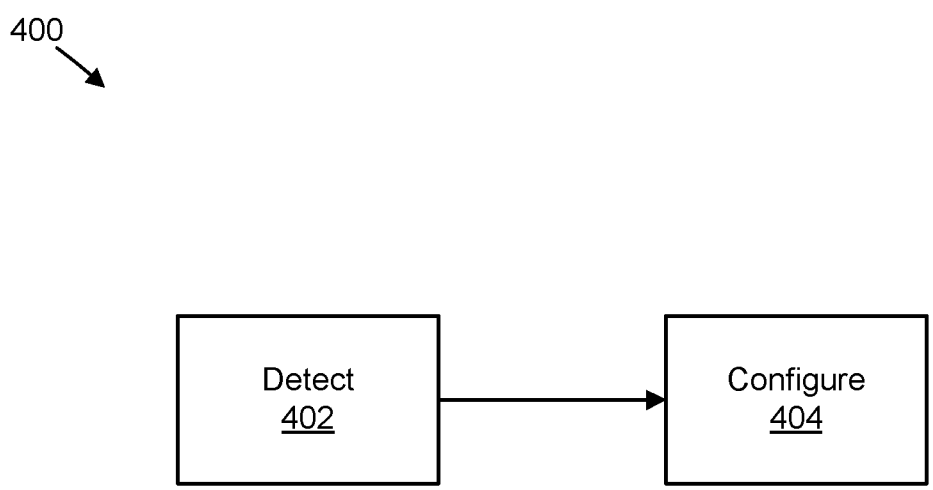
FIG. 4 is a diagram illustrating one embodiment of a method for sidelink mode 1 HARQ operation.

FIG. 4 is a diagram illustrating one embodiment of a method 400 for sidelink mode 1 HARQ operation. The method 400 includes detecting 402 an error and performing a configuration 404 in response to detecting the error.

Table 1 shows a summary of various HARQ error handling embodiments for NR mode 1.

TABLE 1

Summary of Various HARQ Error Handling Embodiments for NR Mode 1

| Embodiment | Errors on Uu Between gNb and TX UE | gNB DCI Transmission | TX UE DCI Interpretation From Reception | TX UE Behavior (e.g., one or more of the listed options) |
|---|---|---|---|---|
| First | NACK to ACK error | NDI is toggled from the previous DCI transmission for a HARQ process, and there is a same or different TB size | TX UE considers NDI toggled | Option 1: Adaptive retransmission on the allocated resource with adjusting code rate by selecting another more suitable MCS if the grant size is different from a previous grant size for the same TB; and/or Option 2: Retransmit a pending transport block for the HARQ process using an NR mode 2 operation; and Option 2a: TX UE performs new transmission internally using a different SL HARQ process ID based on the allocated resource in the received DCI; or Option 2b: TX UE ignores or skips the DCI grant and transmits ACK to the base station. |
| Second | ACK to NACK error | NDI is un-toggled, and there is a same TB size | TX UE considers NDI un-toggled | Option 1: TX UE generates new transmission according to the resource allocated in the DCI; Option 2: Ignore or skip the DCI and transmit ACK in the corresponding feedback; and/or Option 3: TX UE triggers SL BSR reporting. |
| Third | Missed DCI (toggled NDI compared to the previous transmission) and DTX to ACK | NDI is toggled compared to the missed DCI, and there is a same or different TB size | TX UE considers NDI is un-toggled | Option 1: TX UE generates new transmission according to the resource allocated in the DCI; Option 2: Ignore or skip the DCI and transmit ACK in the corresponding feedback; and/or Option 3: TX UE triggers SL BSR reporting. |
| Fourth | Missed DCI (toggled NDI compared to the previous transmission) and DTX to NACK | NDI is un-toggled compared to the missed DCI, there is a same TB size | TX UE considers NDI toggled | Follow the DCI |
| Fifth | Missed DCI (un-toggled NDI compared to the previous transmission) | NDI is toggled compared to the missed DCI, same or different TB size | TX UE considers NDI toggled | Option 1: Adaptive retransmission on the allocated resource with adjusting code rate by selecting another more suitable MCS if the grant size is different than |

TABLE 1-continued

Summary of Various HARQ Error Handling Embodiments for NR Mode 1

| Embodiment | Errors on Uu Between gNb and TX UE | gNB DCI Transmission | TX UE DCI Interpretation From Reception | TX UE Behavior (e.g., one or more of the listed options) |
|---|---|---|---|---|
| | and DTX to ACK | | | the previous grant size for the same TB; and/or Option 2: Retransmit the pending transport block for that HARQ process using NR mode 2 operation; and Option 2a: TX UE performs new transmission internally using a different SL HARQ process ID based on the allocated resource in the received DCI; or Option 2b: TX UE ignores or skips the DCI grant and transmits ACK to the base station. |
| Sixth | Missed DCI (un-toggled NDI compared to the previous transmission) and DTX to NACK | NDI is un-toggled compared to the missed DCI, there is a same TB size | TX UE considers NDI un-toggled | Follow the DCI |

The embodiments of Table 1 are described in additional detail as found in the following embodiments which are also described in relation to FIGS. 5 through 10.

Figure 5:
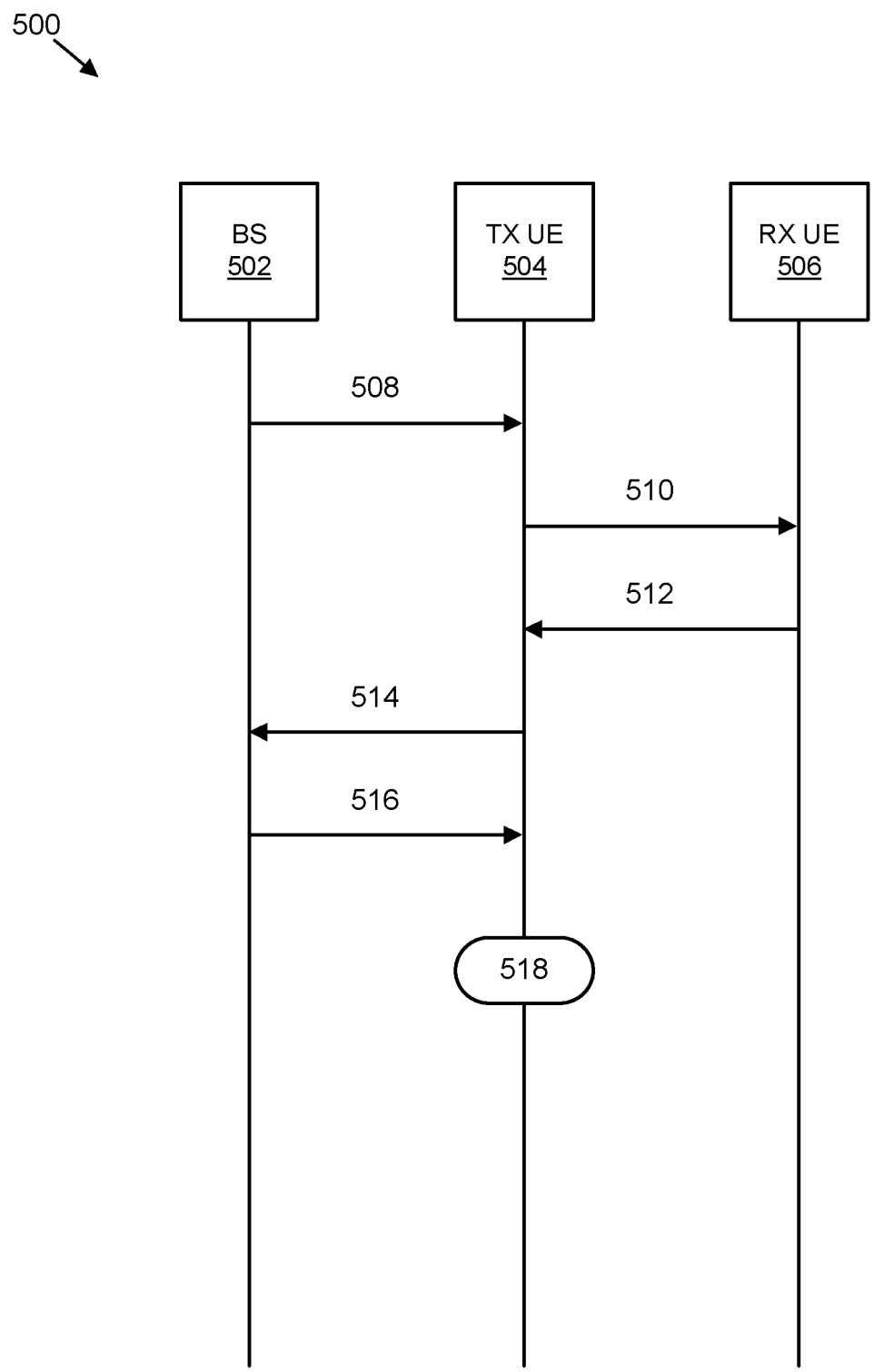
FIG. 5 is a diagram illustrating one embodiment of communications including a NACK to ACK error.

In a first embodiment, there is a NACK to ACK error. Specifically, in the first embodiment, in NR mode 1, if a transmitter UE reports a NACK to a BS upon having received a NACK from an RX UE for a groupcast or unicast transmission to request retransmission resources, and if the BS decodes the NACK as an ACK, then the TX UE may detect the error to prevent packet loss. In the first embodiment, the TX UE expects a retransmission grant from the BS, but the BS transmits DCI with a toggled NDI (e.g., indicating resources for a new initial transmission, not a retransmission). In such an embodiment, the TX UE detects the error from the toggled NDI in DCI and/or if the TB size is different. FIG. 5 shows one embodiment of a protocol error scenario that occurs in the first embodiment.

FIG. 5 is a diagram illustrating one embodiment of communications 500 including a NACK to ACK error. The communications 500 include communications between a BS 502, a TX UE 504, and an RX UE 506. As may be appreciated, each of the communications 500 described herein may include one or more messages.

In a first communication 508 transmitted from the BS 502 to the TX UE 504, the BS 502 transmits a mode 1 SL grant in DCI to the TX UE 504. The mode 1 SL grant, in this embodiment, includes information indicating a first TB (e.g., TB1, a size of the first TB), a HPID=1, and an NDI=0.

In a second communication 510 transmitted from the TX UE 504 to the RX UE 506, the TX UE 504 transmits SCI (e.g., the first TB) to the RX UE 506.

In a third communication 512 transmitted from the RX UE 506 to the TX UE 504, the RX UE 506 transmits NACK (e.g., NACK indicating that the first TB was not received correctly) to the TX UE 504.

In a fourth communication 514 transmitted from the TX UE 504 to the BS 502, the TX UE 504 transmits a NACK indicator to the BS 502. The BS 502 misinterprets the NACK as ACK.

In a fifth communication 516 transmitted from the BS 502 to the TX UE 504, the BS 502 transmits a mode 1 SL grant in DCI to the TX UE 504. The mode 1 SL grant, in this embodiment, includes information indicating a second TB (e.g., TB2, a size of the second TB), a HPID=1, and an NDI=1. Accordingly, the next DCI is transmitted, and the NDI is toggled for the same HARQ process ID.

The TX UE 504 detects 518 the protocol error because of the toggled NDI and/or the second TB being indicated (e.g., due to the second TB having a different size than the first TB). As a result of detecting the error, the TX UE 504 may: 1) perform an adaptive retransmission on the allocated resource with an adjusting code rate by selecting another more suitable MCS if the grant size is different from a previous grant size for the same TB; and/or 2) retransmit the pending transport block (e.g., TB1) for the HARQ process (e.g., 1) using an NR mode 2 operation; and a) perform a new transmission internally using a different SL HARQ process ID (e.g., HPID=2) based on the allocated resource in the received DCI; or b) ignore or skip the DCI grant and transmit ACK to the base station.

In various embodiments, the TX UE 504 determines whether a NACK has been transmitted (e.g., in the third communication 512) in response to the last received sidelink grant. In some embodiments, the TX UE 504, in response to determining that the NACK has been transmitted (e.g., in the third communication 512) in response to the last received sidelink grant and that a current NDI does not match a last received NDI for the HARQ process, generates an autonomous HARQ retransmission for the first TB transmitted based on the last received sidelink grant. In certain embodiments, the TX UE 504, in response to determining that the NACK has been transmitted (e.g., in the third communication 512) in response to the last received sidelink grant and that a current NDI does not match a last received NDI for the HARQ process, selects a second HARQ process, generates a second TB, stores the second TB in a HARQ buffer corresponding to the second HARQ process, and transmits the second TB in the second HARQ process.

Figure 6:
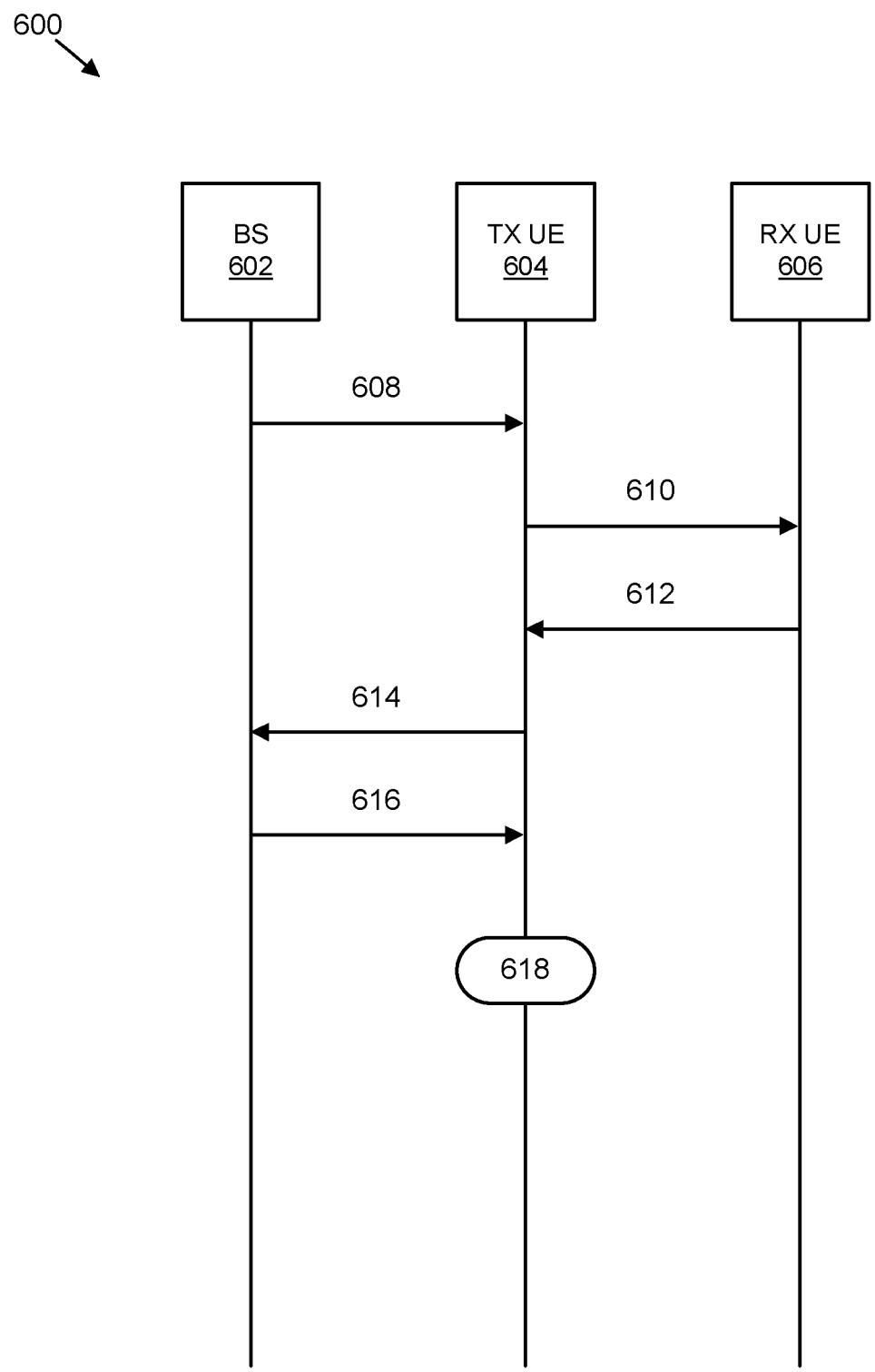
FIG. 6 is a diagram illustrating another embodiment of communications including a NACK to ACK error.

In a second embodiment, there is an ACK to NACK error. Specifically, in the second embodiment, in NR mode 1, if a transmitter UE reports an ACK to a BS upon having received an ACK from an RX UE for a groupcast or unicast transmission to request transmission resources and, if the BS decodes ACK as NACK, then the TX UE may detect the error. In the second embodiment, the TX UE expects a new transmission grant from the BS, but the BS transmits DCI with an un-toggled NDI (e.g., indicating resources for a retransmission, not for a new transmission). In such an embodiment, the TX UE detects the error from the un-toggled NDI in DCI and the SL HARQ feedback which it received from the RX UE. FIG. 6 shows one embodiment of a protocol error scenario that occurs in the second embodiment.

FIG. 6 is a diagram illustrating another embodiment of communications 600 including a NACK to ACK error. The communications 600 include communications between a BS 602, a TX UE 604, and an RX UE 606. As may be appreciated, each of the communications 600 described herein may include one or more messages.

In a first communication 608 transmitted from the BS 602 to the TX UE 604, the BS 602 transmits a mode 1 SL grant in DCI to the TX UE 604. The mode 1 SL grant, in this embodiment, includes information indicating a first TB (e.g., TB1, a size of the first TB), a HPID=1, and an NDI 0.

In a second communication 610 transmitted from the TX UE 604 to the RX UE 606, the TX UE 604 transmits SCI (e.g., the first TB) to the RX UE 606.

In a third communication 612 transmitted from the RX UE 606 to the TX UE 604, the RX UE 606 transmits ACK (e.g., ACK indicating that the first TB was received correctly) to the TX UE 604.

In a fourth communication 614 transmitted from the TX UE 604 to the BS 602, the TX UE 604 transmits an ACK indicator to the BS 602. The BS 602 misinterprets the ACK as NACK.

In a fifth communication 616 transmitted from the BS 602 to the TX UE 604, the BS 602 transmits a mode 1 SL grant in DCI to the TX UE 604. The mode 1 SL grant, in this embodiment, includes information indicating the first TB, a HPID=1, and an NDI=0. Accordingly, the next DCI is transmitted, and the NDI is untoggled for the same HARQ process ID.

The TX UE 604 detects 618 the protocol error because of the untoggled NDI and the knowledge that the TX UE 604 transmitted an ACK to the BS 602. As a result of detecting the error, the TX UE 604 may: 1) generate a new transmission according to the resource allocated in the DCI; 2) ignore or skip the DCI and transmit ACK to the BS 602 in the feedback corresponding to the mode 1 SL grant; and/or 3) trigger SL BSR reporting.

Figure 7:
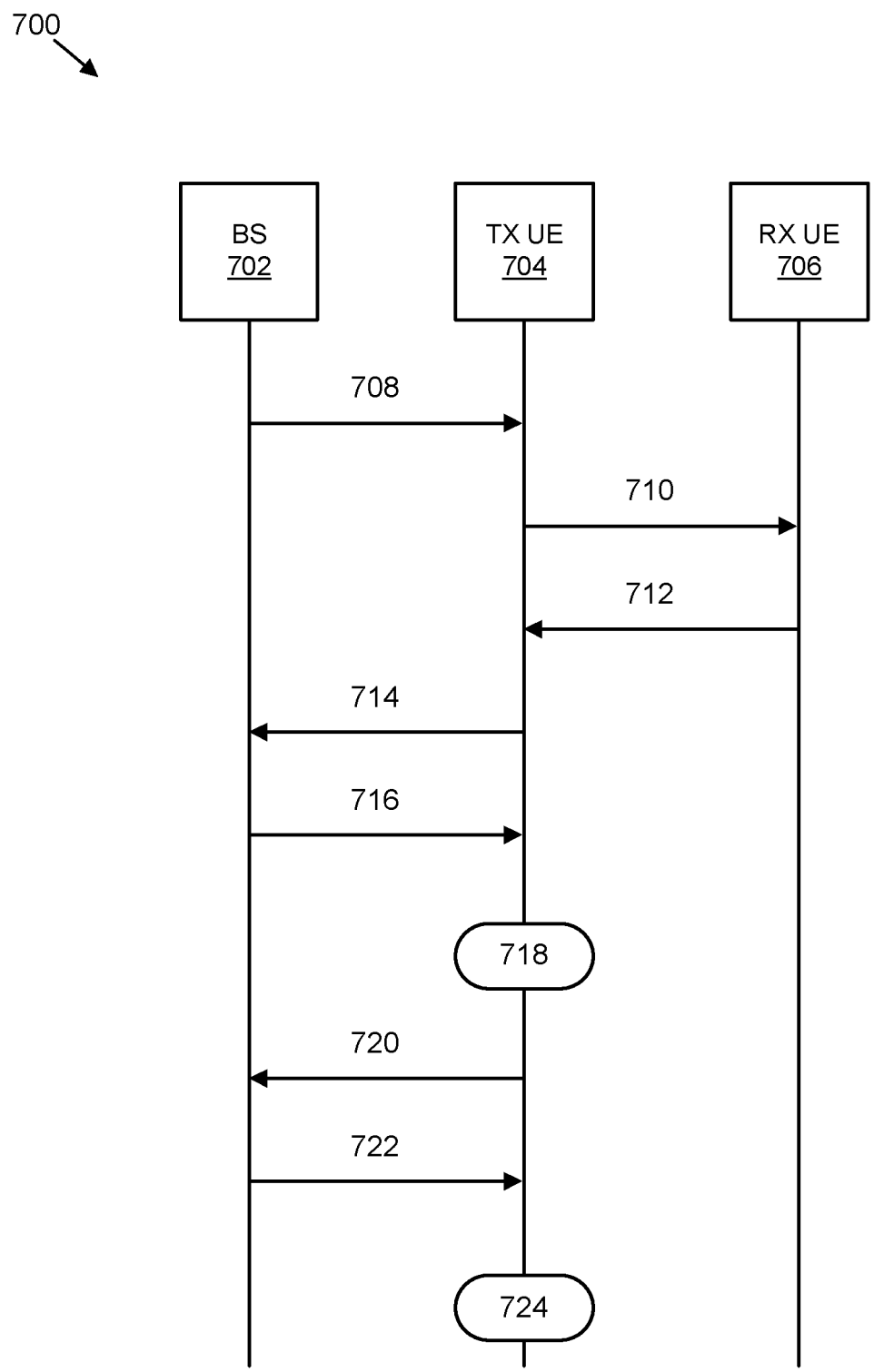
FIG. 7 is a diagram illustrating one embodiment of communications including a missed DCI.

In a third embodiment, a TX UE may miss DCI (e.g., having a toggled NDI compared to a previous transmission) and the TX UE may transmit a DTX to a BS, but the BS may interpret the DTX as an ACK. Specifically, in the third embodiment, in NR mode 1, if the TX UE misses a DCI grant from the BS and the missed DCI contains a toggled NDI compared to its previous transmission (e.g., with the same or a different TB size), and the BS detects DTX as ACK, then, in such an embodiment, the transmission of DCI by the BS may contain a toggled NDI indicating a new transmission and the NDI is untoggled from the TX UE's perspective because the TX UE missed the previous DCI from the base station. FIG. 7 shows one embodiment of a protocol error scenario that occurs in the third embodiment.

FIG. 7 is a diagram illustrating one embodiment of communications 700 including a missed DCI. The communications 700 include communications between a BS 702, a TX UE 704, and an RX UE 706. As may be appreciated, each of the communications 700 described herein may include one or more messages.

In a first communication 708 transmitted from the BS 702 to the TX UE 704, the BS 702 transmits a mode 1 SL grant in DCI to the TX UE 704. The mode 1 SL grant, in this embodiment, includes information indicating a first TB (e.g., TB1, a size of the first TB), a HPID=1, and an NDI=0.

In a second communication 710 transmitted from the TX UE 704 to the RX UE 706, the TX UE 704 transmits SCI (e.g., the first TB) to the RX UE 706.

In a third communication 712 transmitted from the RX UE 706 to the TX UE 704, the RX UE 706 transmits ACK (e.g., ACK indicating that the first TB was received correctly) to the TX UE 704.

In a fourth communication 714 transmitted from the TX UE 704 to the BS 702, the TX UE 704 transmits an ACK indicator to the BS 702.

In a fifth communication 716 transmitted from the BS 702 to the TX UE 704, the BS 702 transmits a mode 1 SL grant in DCI to the TX UE 704. The mode 1 SL grant, in this embodiment, includes information indicating a second TB (e.g., TB2, a size of the second TB), a HPID=1, and an NDI=1. Accordingly, the next DCI is transmitted, and the NDI is toggled for the same HARQ process ID.

The TX UE 704 does not detect 718 the DCI.

In a sixth communication 720 transmitted from the TX UE 704 to the BS 702, the TX UE 704 transmits a DTX indicator to the BS 702. The BS 702 misinterprets the DTX as an ACK.

In a seventh communication 722 transmitted from the BS 702 to the TX UE 704, the BS 702 transmits a mode 1 SL grant in DCI to the TX UE 704. The mode 1 SL grant, in this embodiment, includes information indicating a third TB (e.g., TB3, a size of the third TB), a HPID=1, and an NDI=0. Accordingly, the next DCI is transmitted, and the NDI is toggled for the same HARQ process ID.

The TX UE 704 detects 724 the protocol error because of the NDI being untoggled from the TX UE's 704 perspective and/or the third TB being indicated (e.g., due to the third TB having a different size than the first TB). As a result of detecting the error, the TX UE 704 may: 1) generate a new transmission according to the resource allocated in the DCI; 2) ignore or skip the DCI and transmit ACK to the BS 702 in the feedback corresponding to the mode 1 SL grant; and/or 3) trigger SL BSR reporting. As may be appreciated, the protocol error may have resulted from the combination of the two errors (e.g., the TX UE 704 missing the DCI and the BS 702 interpreting the DTX as ACK).

Figure 8:
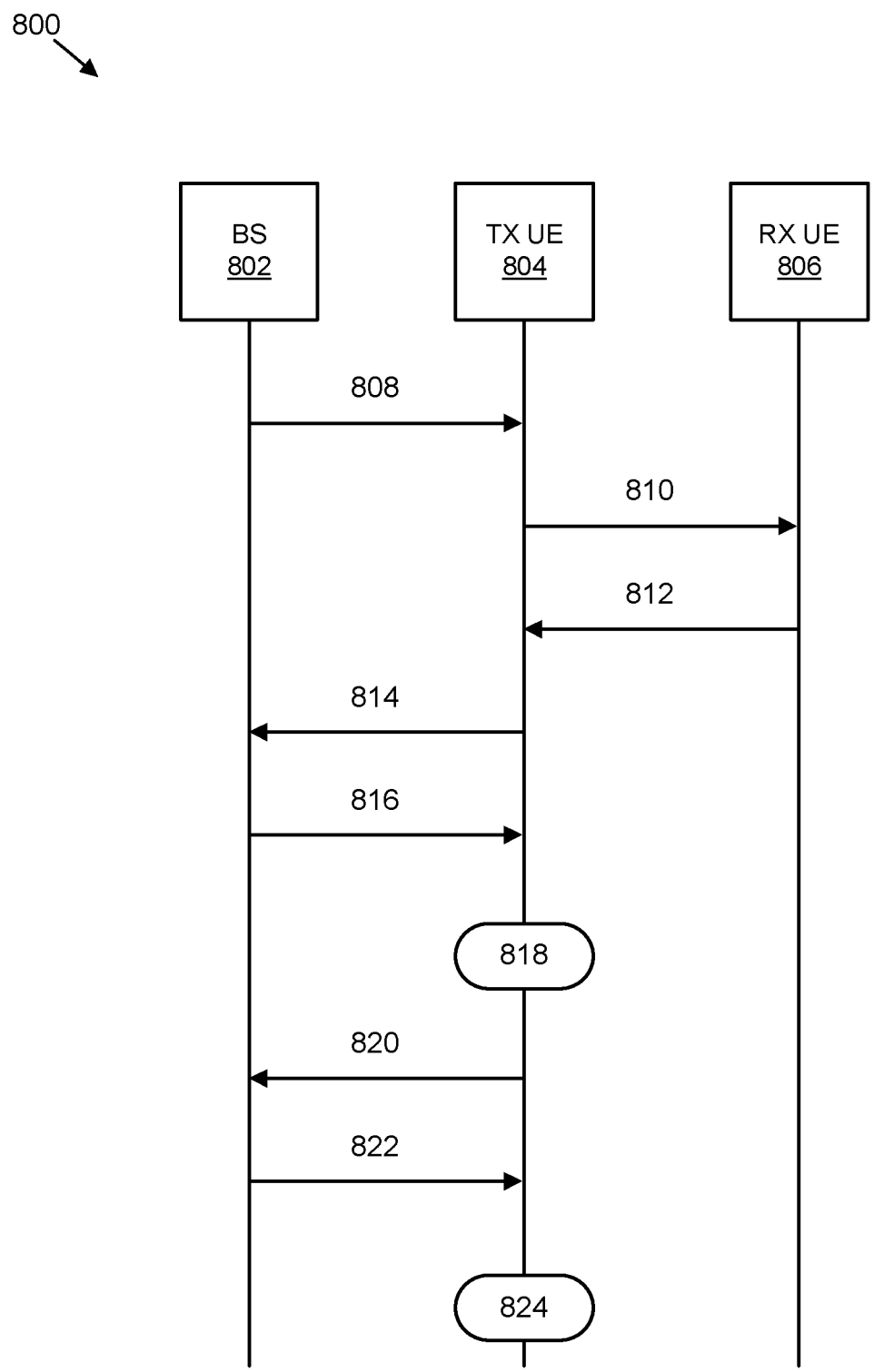
FIG. 8 is a diagram illustrating another embodiment of communications including a missed DCI.

In a fourth embodiment, a TX UE may miss DCI (e.g., having a toggled NDI compared to a previous transmission) and the TX UE may transmit a DTX to a BS, but the BS may interpret the DTX as a NACK. Specifically, in the fourth embodiment, in NR mode 1, if TX UE misses a DCI grant from the BS and the missed DCI contains a toggled NDI compared to its previous transmission (e.g., with the same or a different TB size), and the BS detects DTX as NACK, then, in such an embodiment, the transmission of DCI by the BS may contain an untoggled NDI indicating resource for retransmission and the NDI is toggled from the TX UE's perspective because the TX UE missed the previous DCI from the BS. FIG. 8 shows one embodiment of a protocol error scenario that occurs in the fourth embodiment.

FIG. 8 is a diagram illustrating another embodiment of communications 800 including a missed DCI. The communications 800 include communications between a BS 802, a TX UE 804, and an RX UE 806. As may be appreciated, each of the communications 800 described herein may include one or more messages.

In a first communication 808 transmitted from the BS 802 to the TX UE 804, the BS 802 transmits a mode 1 SL grant in DCI to the TX UE 804. The mode 1 SL grant, in this embodiment, includes information indicating a first TB (e.g., TB1, a size of the first TB), a HPID=1, and an NDI=0.

In a second communication 810 transmitted from the TX UE 804 to the RX UE 806, the TX UE 804 transmits SCI (e.g., the first TB) to the RX UE 806. Furthermore, in the second communication 810, the TX UE 804 may transmit the first TB in a physical layer sidelink shared channel to the RX UE 806 according to the received mode 1 SL grant in the first communication 808.

In a third communication 812 transmitted from the RX UE 806 to the TX UE 804, the RX UE 806 transmits ACK (e.g., ACK indicating that the first TB was received correctly) to the TX UE 804.

In a fourth communication 814 transmitted from the TX UE 804 to the BS 802, the TX UE 804 transmits an ACK indicator to the BS 802.

In a fifth communication 816 transmitted from the BS 802 to the TX UE 804, the BS 802 transmits a mode 1 SL grant in DCI to the TX UE 804. The mode 1 SL grant, in this embodiment, includes information indicating a second TB (e.g., TB2, a size of the second TB), a HPID=1, and an NDI=1. Accordingly, the next DCI is transmitted, and the NDI is toggled for the same HARQ process ID.

The TX UE 804 does not detect 818 the DCI.

In a sixth communication 820 transmitted from the TX UE 804 to the BS 802, the TX UE 804 transmits a DTX indicator to the BS 802. As used herein, DTX may mean that a UE (e.g., TX UE) does not transmit any information (e.g., ACK and/or NACK) in a PUCCH resource. The BS 802 misinterprets the DTX as a NACK.

In a seventh communication 822 transmitted from the BS 802 to the TX UE 804, the BS 802 transmits a mode 1 SL grant in DCI to the TX UE 804. The mode 1 SL grant, in this embodiment, includes information indicating a second TB (e.g., TB2, a size of the second TB), a HPID=1, and an NDI=1. Accordingly, the next DCI is transmitted, and the NDI is toggled for the same HARQ process ID.

The TX UE 804 detects 824 that there is no protocol error because of the NDI being toggled from the TX UE's 804 perspective. Accordingly, the TX UE 804 may operate as if no error has occurred.

Figure 9:
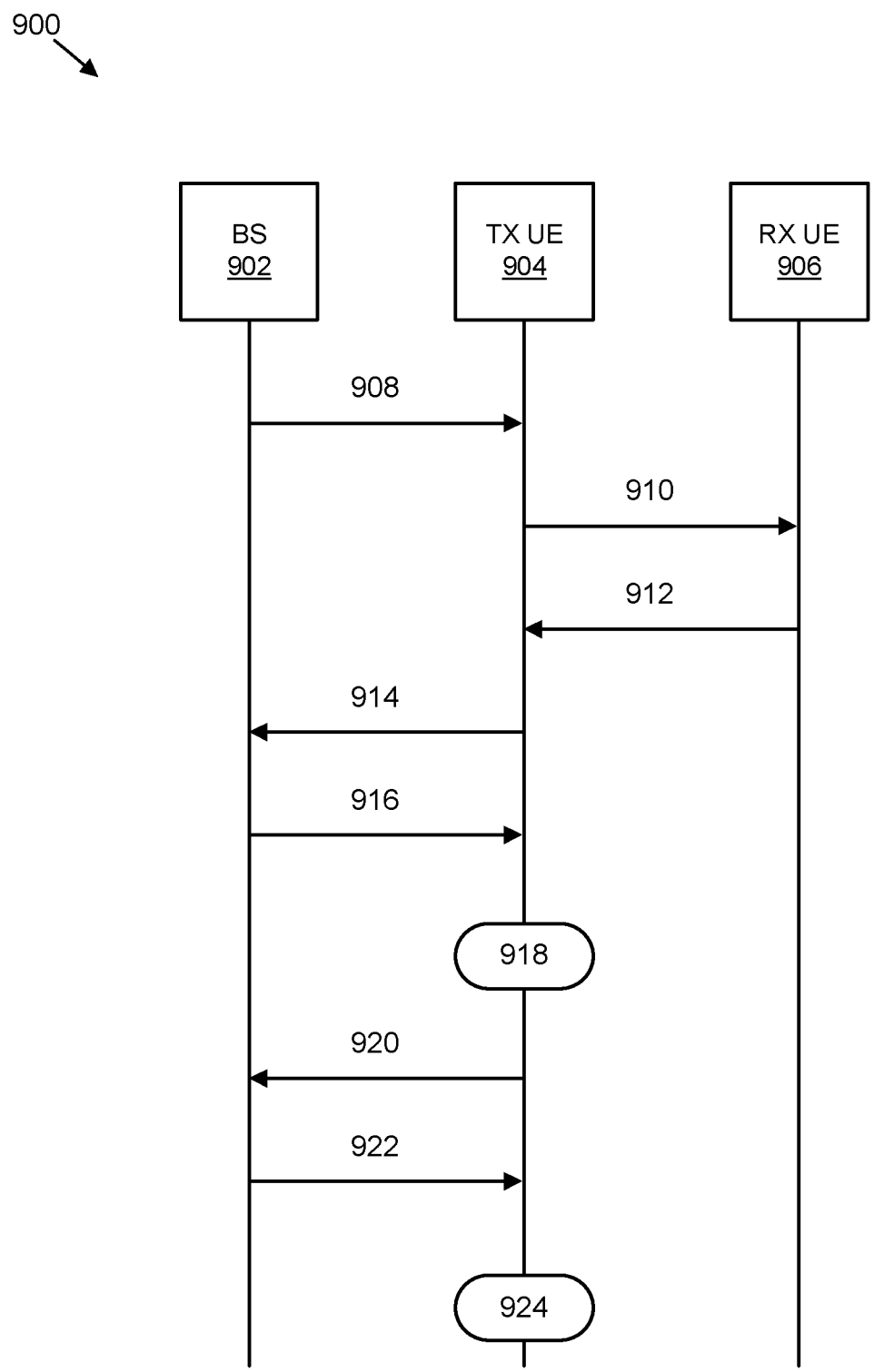
FIG. 9 is a diagram illustrating a further embodiment of communications including a missed DCI.

In a fifth embodiment, a TX UE may miss DCI (e.g., having an untoggled NDI compared to the previous transmission) and the TX UE may transmit a DTX to a BS, but the BS may interpret the DTX as an ACK. Specifically, in the fifth embodiment, in NR mode 1, if the TX UE misses a DCI grant from the BS and the missed DCI contains an untoggled NDI compared to its previous transmission (e.g., with the same or a different TB size), and the BS detects DTX as ACK, then, in such an embodiment, the transmission of DCI by the BS may contain a toggled NDI indicating a new transmission and also the NDI is toggled from the TX UE's perspective because the TX UE missed the previous DCI from the BS. FIG. 9 shows one embodiment of a protocol error scenario that occurs in the fifth embodiment.

FIG. 9 is a diagram illustrating a further embodiment of communications 900 including a missed DCI. The communications 900 include communications between a BS 902, a TX UE 904, and an RX UE 906. As may be appreciated, each of the communications 900 described herein may include one or more messages.

In a first communication 908 transmitted from the BS 902 to the TX UE 904, the BS 902 transmits a mode 1 SL grant in DCI to the TX UE 904. The mode 1 SL grant, in this embodiment, includes information indicating a first TB (e.g., TB1, a size of the first TB), a HPID=1, and an NDI=0.

In a second communication 910 transmitted from the TX UE 904 to the RX UE 906, the TX UE 904 transmits SCI (e.g., the first TB) to the RX UE 906. Furthermore, in the second communication 910, the TX UE 904 may transmit first TB in a physical layer sidelink shared channel to the RX UE 906 according to the received mode 1 SL grant in the first communication 908.

In a third communication 912 transmitted from the RX UE 906 to the TX UE 904, the RX UE 906 transmits NACK (e.g., NACK indicating that the first TB was not received correctly) to the TX UE 904.

In a fourth communication 914 transmitted from the TX UE 904 to the BS 902, the TX UE 904 transmits a NACK indicator to the BS 902.

In a fifth communication 916 transmitted from the BS 902 to the TX UE 904, the BS 902 transmits a mode 1 SL grant in DCI to the TX UE 904. The mode 1 SL grant, in this embodiment, includes information indicating the first TB (e.g., TB1, a size of the first TB), a HPID=1, and an NDI=0. Accordingly, the next DCI is transmitted, and the NDI is untoggled for the same HARQ process ID.

The TX UE 904 does not detect 918 the DCI.

In a sixth communication 920 transmitted from the TX UE 904 to the BS 902, the TX UE 904 transmits a DTX indicator to the BS 902. The BS 902 misinterprets the DTX as an ACK.

In a seventh communication 922 transmitted from the BS 902 to the TX UE 904, the BS 902 transmits a mode 1 SL grant in DCI to the TX UE 904. The mode 1 SL grant, in this embodiment, includes information indicating a second TB (e.g., TB2, a size of the second TB), a HPID=1, and an NDI=1. Accordingly, the next DCI is transmitted, and the NDI is toggled for the same HARQ process ID.

The TX UE 904 detects 924 the protocol error because of the NDI being untoggled from the TX UE's 904 perspective and/or the third TB being indicated (e.g., due to the third TB having a different size than the first TB). As a result of detecting the error, the TX UE 904 may: 1) perform an adaptive retransmission on the allocated resource with an adjusting code rate by selecting another more suitable MCS if the grant size is different from a previous grant size for the same TB; and/or 2) retransmit the pending transport block (e.g., TB1) for the HARQ process (e.g., 1) using an NR mode 2 operation; and a) perform a new transmission internally using a different SL HARQ process ID (e.g., HPID=2) based on the allocated resource in the received DCI; or b) ignore or skip the DCI grant and transmit ACK to the base station. As may be appreciated, the protocol error may have resulted from the combination of the two errors (e.g., the TX UE 904 missing the DCI and the BS 902 interpreting the DTX as ACK).

Figure 10:
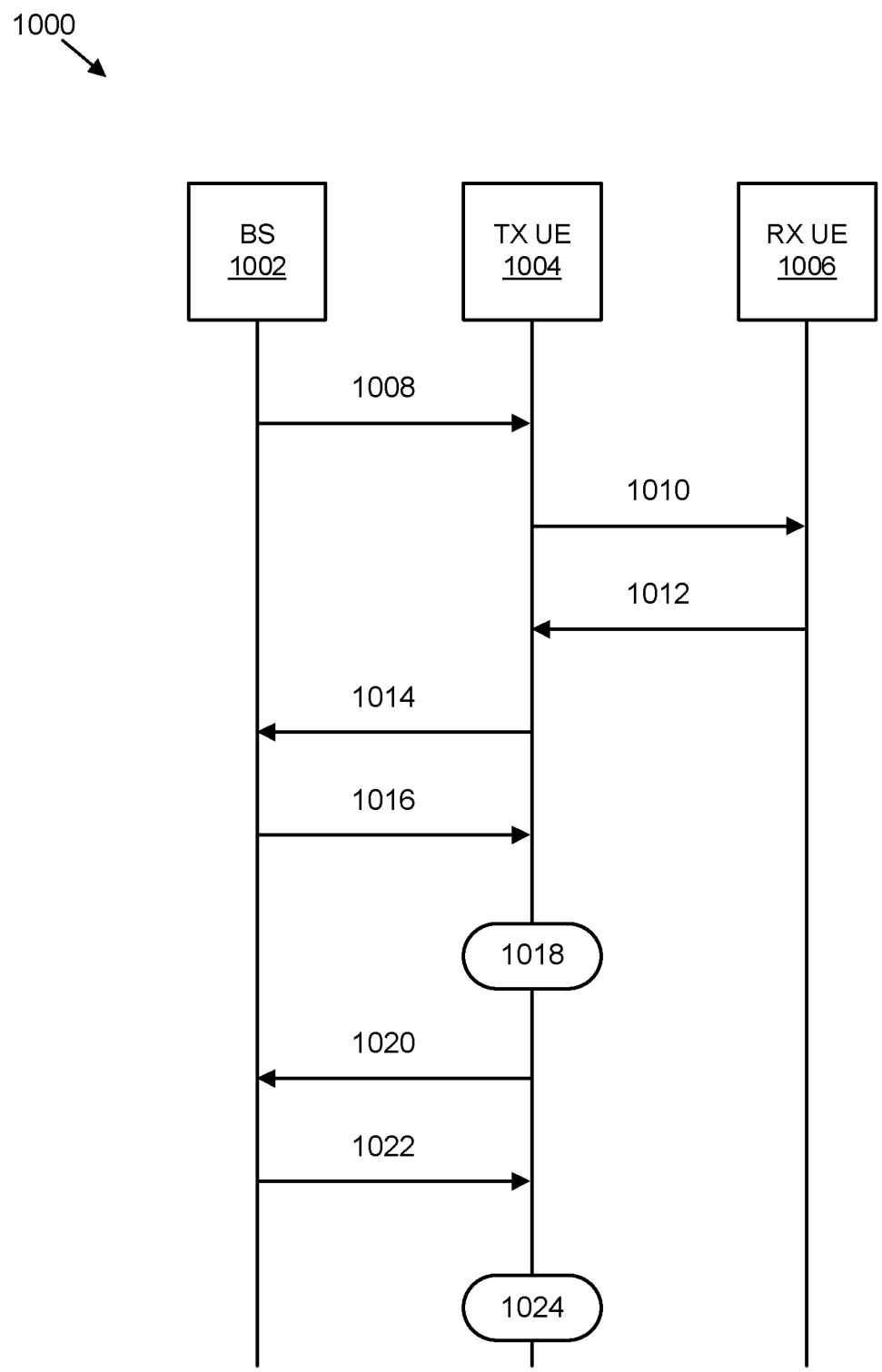
FIG. 10 is a diagram illustrating yet another embodiment of communications including a missed DCI.

In a sixth embodiment, a TX UE may miss DCI (e.g., having an untoggled NDI compared to the previous transmission) and the TX UE may transmit a DTX to a BS, but the BS may interpret the DTX as a NACK. Specifically, in the sixth embodiment, in NR mode 1, if TX UE misses a DCI grant from the BS and the missed DCI contains an untoggled NDI compared to its previous transmission (e.g., with the same or different TB size), and the BS detects DTX as NACK, then, in such an embodiment, the transmission of DCI by the BS may contain an untoggled NDI indicating a new transmission and also the NDI is untoggled from the TX UE's perspective because the TX UE missed the previous DCI from the BS. FIG. 10 shows one embodiment of a protocol error scenario that occurs in the sixth embodiment.

FIG. 10 is a diagram illustrating yet another embodiment of communications 1000 including a missed DCI. The communications 1000 include communications between a BS 1002, a TX UE 1004, and an RX UE 1006. As may be appreciated, each of the communications 1000 described herein may include one or more messages.

In a first communication 1008 transmitted from the BS 1002 to the TX UE 1004, the BS 1002 transmits a mode 1 SL grant in DCI to the TX UE 1004. The mode 1 SL grant, in this embodiment, includes information indicating a first TB (e.g., TB1, a size of the first TB), a HPID=1, and an NDI=0.

In a second communication 1010 transmitted from the TX UE 1004 to the RX UE 1006, the TX UE 1004 transmits SCI (e.g., the first TB) to the RX UE 1006. Furthermore, in the second communication 1010, the TX UE 1004 may transmit the first TB in a physical layer sidelink shared channel to the RX UE 1006 according to the received mode 1 SL grant in the first communication 1008.

In a third communication 1012 transmitted from the RX UE 1006 to the TX UE 1004, the RX UE 1006 transmits NACK (e.g., NACK indicating that the first TB was not received correctly) to the TX UE 1004.

In a fourth communication 1014 transmitted from the TX UE 1004 to the BS 1002, the TX UE 1004 transmits a NACK indicator to the BS 1002.

In a fifth communication 1016 transmitted from the BS 1002 to the TX UE 1004, the BS 1002 transmits a mode 1 SL grant in DCI to the TX UE 1004. The mode 1 SL grant, in this embodiment, includes information indicating the first TB (e.g., TB1, a size of the first TB), a HPID=1, and an NDI=0. Accordingly, the next DCI is transmitted, and the NDI is toggled for the same HARQ process ID.

The TX UE 1004 does not detect 1018 the DCI.

In a sixth communication 1020 transmitted from the TX UE 1004 to the BS 1002, the TX UE 1004 transmits a DTX indicator to the BS 1002. The BS 1002 misinterprets the DTX as a NACK.

In a seventh communication 1022 transmitted from the BS 1002 to the TX UE 1004, the BS 1002 transmits a mode 1 SL grant in DCI to the TX UE 1004. The mode 1 SL grant, in this embodiment, includes information indicating the first TB (e.g., TB1, a size of the first TB) for retransmission, a HPID=1, and an NDI=0. Accordingly, the next DCI is transmitted, and the NDI is untoggled for the same HARQ process ID.

The TX UE 1004 detects 1024 that there is no protocol error because of the NDI being untoggled from the TX UE's 1004 perspective. Accordingly, the TX UE 1004 may operate as if no error has occurred.

In one embodiment, for NR mode 1, if a TX UE reports NACK to a BS upon having received NACK from an RX UE for a groupcast or unicast transmission to request a retransmission resources and instead the TX UE receives DCI from the BS with an NDI toggled compared to its current NDI state for the same HARQ process ID, then the TX UE may behaves in one of the following ways: 1) once the TX UE considers NDI toggled in the received DCI if it was expecting a retransmission grant, the received DCI grant may still be used for retransmission of the pending transport block stored in the HARQ buffer for that HARQ process ID (e.g., if the TX UE reported NACK for the previous SL transmission) and if the TX UE could perform adaptive retransmission (e.g., by changing a code rate by suitably selecting an MCS according to the allocated resource in the received DCI); or 2) the TX UE may retransmit the pending transport block (e.g., if it is stored for retransmission in the HARQ process) rather using an NR mode 2 operation in which the TX UE may autonomously select suitable resource for transmission from a candidate resource set using a sensing method and the selection window is set according to the remaining packet delay budget, and, if the TX UE chooses to do retransmission using NR Mode 2 operation, it could further choose between one of the following sub-embodiments for treating the received DCI grant from the base station: a) the TX UE follows the DCI grant received from the base station for a new sidelink transmission if the TX UE could internally use a different HARQ process ID for transmission to receiver UEs for the sidelink transmission (e.g., by indicated within SCI a HARQ process ID that is different from the HARQ process ID indicated within the DCI from the gNB); or b) the TX UE may decide to skip or ignore the received DCI grant and as an enhancement transmit ACK to the BS.

In another embodiment, for NR mode 1, if a TX UE reports ACK to the BS upon having received ACK from an RX UE for a groupcast or unicast transmission to request new transmission resources, but if the TX UE receives DCI from the BS containing NDI that it considers untoggled compared to its current state for the same HARQ process ID, then the TX UE behaves in one of the following ways: 1) the TX UE follows the DCI grant received from the BS for a new sidelink transmission if the TX UE could use a different HARQ process ID for the sidelink transmission (e.g., indicated within SCI) then the HARQ process ID indicated within the DCI from the BS; 2); the TX UE may decide to skip or ignore the received DCI grant and transmit ACK to the BS; and/or 3) the TX UE may trigger sidelink BSR reporting to the BS.

In one example, embodiments described herein may be implemented in a MAC specification as shown in Table 2.

TABLE 2

If UE receives a SL grant (DCI) addressed to the UE's SL RNTI allocating resources for the PSSCH and PUCCH:
    If the NDI received in the SL grant is toggled compared the last received SL grant (DCI) for the same HARQ
    process:
        If UE transmitted NACK to the gNB in response to the last received SL grant (DCI) for that HARQ
        process:
            Switch to mode 2 for that HARQ process;
            Generate an autonomous HARQ retransmission for the TB;
            Select one of the HARQ processes available for a new initial HARQ transmission;
            Generate a new TB according to the received SL grant and store the TB in the HARQ buffer of
            the selected HARQ process; and
            Transmit the generated TB for the selected HARQ process;
        Else (UE transmitted ACK):
            Generate a new TB according to the received SL grant (DCI) and transmit it in this HARQ
            process;
    If the NDI received in the SL grant is un-toggled compared to the last received SL grant (DCI) for the same
    HARQ process:
        If UE transmitted an ACK in response to the last received SL grant (DCI) for that HARQ process:
            Consider the NDI is toggled;
            Generate a new TB for this HARQ processes according to the received SL grant; and TABLE 2-continued Transmit the TB for this HARQ process;
Else (UE transmitted NACK);
   Perform a HARQ retransmission of the TB stored in the HARQ buffer of this HARQ process.

In certain embodiments, in NR mode 1, a TX UE starts a timer after transmitting NACK to a BS for a groupcast or unicast HARQ transmission (or retransmission), and before expiration of the timer, the TX UE expects a retransmission grant from the BS. In such embodiments, while the timer is running, if the TX UE does not detect a DCI with the same HARQ ID for the process in which it transmitted HARQ-NACK to gNB, the TX UE may, upon detection of the error (e.g., when the timer expires and no DCI indicating retransmission resources was received), perform a retransmission of the previous pending transport block for which a NACK was sent to the BS by switching to NR mode 2 operation for that HARQ process ID. In various embodiments, a TX UE may drop a packet from its buffer and signal to one or more RX UEs to clear a soft buffer for that HARQ process ID using a toggled NDI within SCI. In such embodiments, the TX UE may choose to either drop the packet or perform retransmission in NR mode 2 operation (e.g., based on a QoS priority of the packet to be transmitted and/or congestion metric, packet delay budget if the packet delay budget still allows performance of a retransmission), then the UE may switch to mode 2 and perform an autonomous retransmission. In some embodiments, a configuration of a timer may be set based on a packet delay budget. In certain embodiments, a BS doesn't schedule retransmission for a pending packet because a PDB is already exceeded.

In various embodiments, there is a misaligned counter between a gNB and a TX UE. In such embodiments, if there is an error between the gNB and the TX UE (e.g., a missed DCI and a DTX is interpreted as an ACK, a NACK is interpreted as an ACK, an ACK is interpreted as a NACK), an actual retransmission number (or redundancy version) signaled in DCI between the TX UE and the gNB may be different from that used in SCI transmitted between the TX UE and the RX UE. In one embodiment, if there is a mismatch between a retransmission number, then a TX UE may ignore the redundancy version indicated by a gNB in DCI and transmit another redundancy version (e.g., correct redundancy version) in SCI. In another embodiment, a TX UE may indicate in uplink signaling to a BS (either in L1, L2, and/or L3 signaling that corresponds to either a physical layer, a MAC layer, or RRC signaling to the BS) about a mismatch in redundancy versions via a signaled HARQ retransmission counter, one or more transmission parameters, and/or one or more HARQ parameters from the BS in DCI and/or via actual transmission between the TX UE and RX UEs in SCI.

In certain embodiments, if a gNB configures a TX UE with resources for 'k' blind repetitions, and if the TX UE receives an ACK from an RX UE before an end period of the scheduled 'k' repetition, then the TX UE may transmit an ACK to the gNB to free SL resources for other SL transmissions. In such embodiments, a time domain configuration of UL feedback resources (e.g., in terms of slots, minislots, or symbols) may be indicated either dynamically or semi statically via signaling.

In some embodiments, a gNB configures sidelink common feedback resource for every beam, spatial direction, or panel for a TX UE and the TX UE may use beam sweeping in a different spatial direction and/or time domain for repeated transmission of a same TB or to perform a multi-beam operation of a TB. In such embodiments, if RX UEs fail to decode a groupcast or broadcast transport block in a certain time slot, minislot, and/or symbol and in a certain spatial direction, RX UEs may choose to transmit NACK over a sidelink feedback resource assigned for that particular beam, spatial direction, or panel.

In various embodiments, a TX UE may associate a received NACK with a particular beam, beam spatial direction, or panel, based on the received NACK per beam, beam spatial direction, or panel. In such embodiments, the TX UE may selectively retransmit in that particular beam, spatial direction, or panel. Moreover, in such embodiments, a resource configuration of a common NACK resource set may depend on a configuration of a number of beams or panels in the TX UE. In certain embodiments, SL common feedback resources that are configured for each beam, spatial direction, or panel may be differentiated either in time, frequency, or code resource sets, and may be indicated via L1, L2, or L3 signaling.

Figure 11:
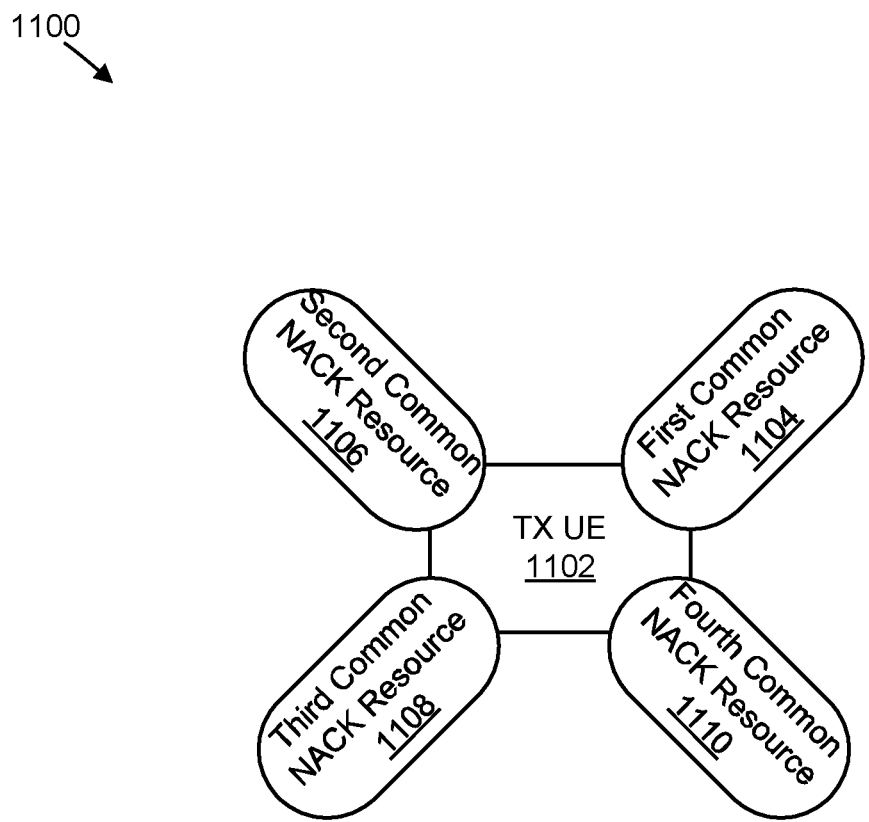
FIG. 11 is a block diagram illustrating one embodiment a system including a TX UE.

FIG. 11 is a block diagram illustrating one embodiment a system 1100 including a TX UE 1102 that may be used in embodiments described herein. The TX UE 1102 includes a first common NACK resource 1104, a second common NACK resource 1106, a third common NACK resource 1108, and a fourth common NACK resource 1110.

Figure 12:
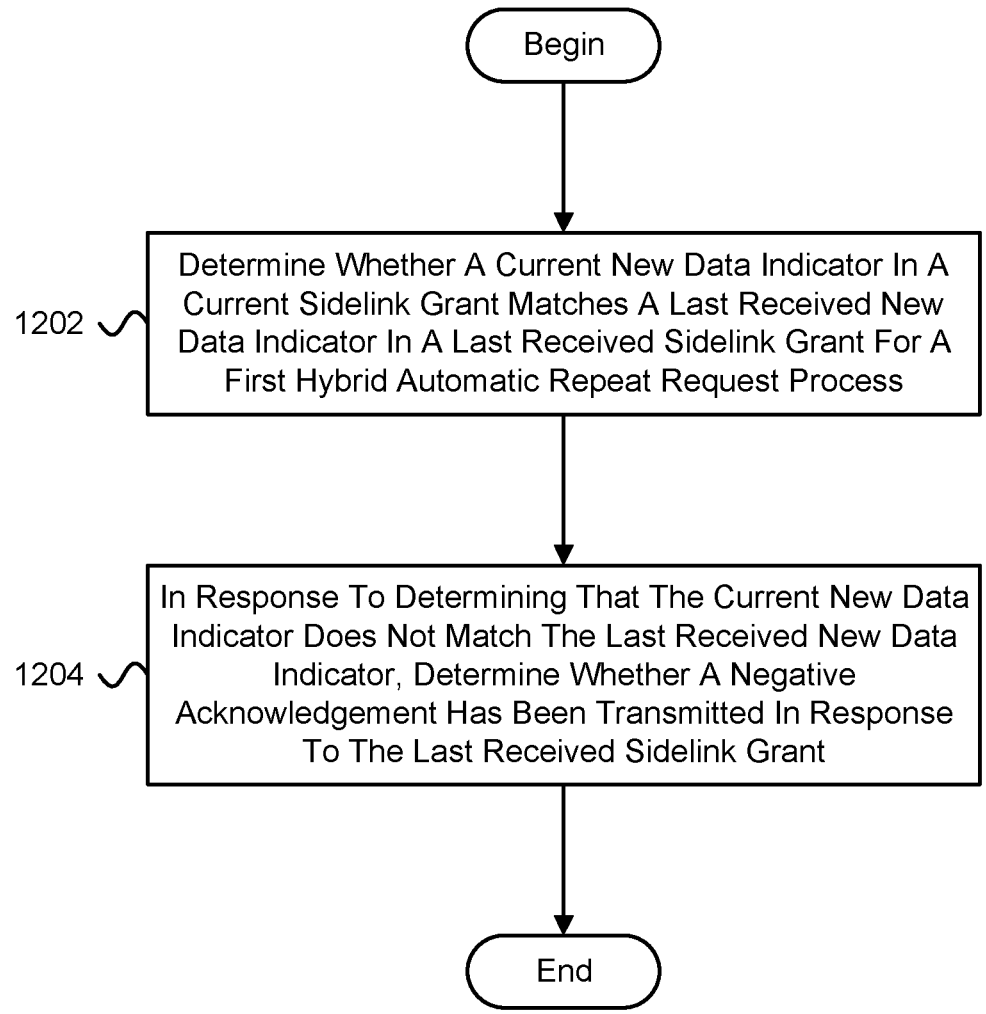
FIG. 12 is a flow chart diagram illustrating one embodiment of a method for responding to a new data indicator for a hybrid automatic repeat request process.

FIG. 12 is a flow chart diagram illustrating one embodiment of a method 1200 for responding to a new data indicator for a hybrid automatic repeat request process. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes determining 1202 whether a current new data indicator in a current sidelink grant matches a last received new data indicator in a last received sidelink grant for a first hybrid automatic repeat request process. In some embodiments, the method 1200 includes, in response to determining that the current new data indicator does not match the last received new data indicator, determining 1204 whether a negative acknowledgement has been transmitted in response to the last received sidelink grant. It should be noted that the negative acknowledgement is based on a negative acknowledgment received from RX UEs (e.g., at least one RX UE from a groupcast transmission) in PSFCH.

In certain embodiments, the method 1200 further comprises, in response to determining: that the negative acknowledgement has been transmitted in response to the last received sidelink grant; and that the current new data indicator does not match the last received new data indicator for the first hybrid automatic repeat request process; switching from a first mode to a second mode for the first hybrid automatic repeat request process. In some embodiments, the method 1200 further comprises, in response to determining: that the negative acknowledgement has been transmitted in response to the last received sidelink grant; and that the current new data indicator does not match the last received new data indicator for the first hybrid automatic repeat request process; generating an autonomous hybrid automatic repeat request retransmission for a first transport block transmitted based on the last received sidelink grant.

In various embodiments, the method 1200 further comprises, in response to determining: that the negative acknowledgement has been transmitted in response to the last received sidelink grant; and that the current new data indicator does not match the last received new data indicator for the first hybrid automatic repeat request process; selecting a second hybrid automatic repeat request process from a plurality of available hybrid automatic repeat request processes; generating a second transport block corresponding to the current sidelink grant; storing the second transport block in a hybrid automatic repeat request buffer corresponding to the second hybrid automatic repeat request process; and transmitting the second transport block in the second hybrid automatic repeat request process. In one embodiment, the method 1200 further comprises, in response to determining: that the negative acknowledgement has been transmitted in response to the last received sidelink grant; and that the current new data indicator does not match the last received new data indicator for the first hybrid automatic repeat request process; ignoring or skipping the current sidelink grant and transmitting a positive acknowledgment to a base station.

In certain embodiments, the method 1200 further comprises, in response to determining that a positive acknowledgement has been transmitted in response to the last received sidelink grant: generating the second transport block corresponding to the current sidelink grant; and transmitting the second transport block in the first hybrid automatic repeat request process. In some embodiments, the method 1200 further comprises, in response to the current new data indicator matching the last received new data indicator, determining whether a positive acknowledgement has been transmitted in response to the last received sidelink grant.

In various embodiments, the method 1200 further comprises, in response to determining that the positive acknowledgement has been transmitted in response to the last received sidelink grant: considering the new data indicator as toggled; generating the second transport block for the first hybrid automatic repeat request process according to the current sidelink grant; and transmitting the second transport block in the first hybrid automatic repeat request process. In one embodiment, the method 1200 further comprises, in response to determining that the negative acknowledgement has been transmitted in response to the last received sidelink grant: performing a hybrid automatic repeat request retransmission of the first transport block stored in a hybrid automatic repeat request buffer for the first hybrid automatic repeat request process.

Figure 13:
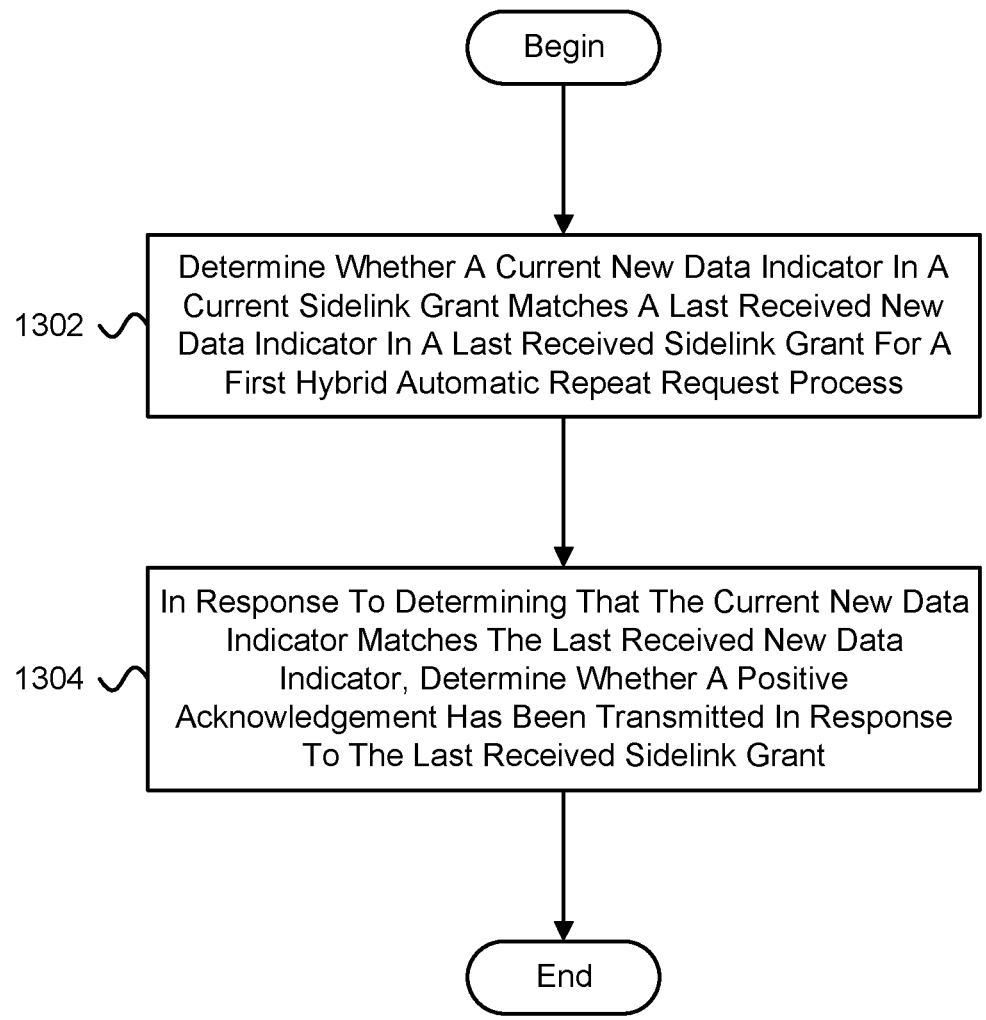
FIG. 13 is a flow chart diagram illustrating another embodiment of a method for responding to a new data indicator for a hybrid automatic repeat request process.

FIG. 13 is a flow chart diagram illustrating another embodiment of a method 1300 for responding to a new data indicator for a hybrid automatic repeat request process. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes determining 1302 whether a current new data indicator in a current sidelink grant matches a last received new data indicator in a last received sidelink grant for a first hybrid automatic repeat request process. In some embodiments, the method 1300 includes, in response to determining that the current new data indicator matches the last received new data indicator, determining 1304 whether a positive acknowledgement has been transmitted in response to the last received sidelink grant.

In certain embodiments, the method 1300 further comprises, in response to determining: that the positive acknowledgement has been transmitted in response to the last received sidelink grant; and that the current new data indicator matches the last received new data indicator for the first hybrid automatic repeat request process; considering the new data indicator as toggled. In some embodiments, the method 1300 further comprises generating a second transport block for the first hybrid automatic repeat request process according to the current sidelink grant.

In various embodiments, the method 1300 further comprises transmitting the second transport block in the first hybrid automatic repeat request process. In one embodiment, the method 1300 further comprises, in response to determining that a negative acknowledgement has been transmitted in response to the last received sidelink grant: performing a hybrid automatic repeat request retransmission of a first transport block stored in a hybrid automatic repeat request buffer for the first hybrid automatic repeat request process.

In certain embodiments, the method 1300 further comprises, in response to the current new data indicator not matching the last received new data indicator, determining whether a negative acknowledgement has been transmitted in response to the last received sidelink grant. In some embodiments, the method 1300 further comprises, in response to determining that the negative acknowledgement has been transmitted in response to the last received sidelink grant: switching from a first mode to a second mode for the first hybrid automatic repeat request process; generating an autonomous hybrid automatic repeat request retransmission for a first transport block transmitted based on the last received sidelink grant; selecting a second hybrid automatic repeat request process from a plurality of available hybrid automatic repeat request processes; generating a second transport block corresponding to the current sidelink grant; storing the second transport block in a hybrid automatic repeat request buffer corresponding to the second hybrid automatic repeat request process; and transmitting the second transport block in the second hybrid automatic repeat request process.

In various embodiments, the method 1300 further comprises, in response to determining that the positive acknowledgement has been transmitted in response to the last received sidelink grant: generating a second transport block corresponding to the current sidelink grant; and transmitting the second transport block in the first hybrid automatic repeat request process.

In one embodiment, a method comprises: determining whether a current new data indicator in a current sidelink grant matches a last received new data indicator in a last received sidelink grant for a first hybrid automatic repeat request process; and, in response to determining that the current new data indicator does not match the last received new data indicator, determining whether a negative acknowledgement has been transmitted in response to the last received sidelink grant.

In certain embodiments, the method further comprises, in response to determining: that the negative acknowledgement has been transmitted in response to the last received sidelink grant; and that the current new data indicator does not match the last received new data indicator for the first hybrid automatic repeat request process; switching from a first mode to a second mode for the first hybrid automatic repeat request process.

In some embodiments, the method further comprises, in response to determining: that the negative acknowledgement has been transmitted in response to the last received sidelink grant; and that the current new data indicator does not match the last received new data indicator for the first hybrid automatic repeat request process; generating an autonomous hybrid automatic repeat request retransmission for a first transport block transmitted based on the last received sidelink grant.

In various embodiments, the method further comprises, in response to determining: that the negative acknowledgement has been transmitted in response to the last received sidelink grant; and that the current new data indicator does not match the last received new data indicator for the first hybrid automatic repeat request process; selecting a second hybrid automatic repeat request process from a plurality of available hybrid automatic repeat request processes; generating a second transport block corresponding to the current sidelink grant; storing the second transport block in a hybrid automatic repeat request buffer corresponding to the second hybrid automatic repeat request process; and transmitting the second transport block in the second hybrid automatic repeat request process.

In one embodiment, the method further comprises, in response to determining: that the negative acknowledgement has been transmitted in response to the last received sidelink grant; and that the current new data indicator does not match the last received new data indicator for the first hybrid automatic repeat request process; ignoring or skipping the current sidelink grant and transmitting a positive acknowledgment to a base station.

In certain embodiments, the method further comprises, in response to determining that a positive acknowledgement has been transmitted in response to the last received sidelink grant: generating the second transport block corresponding to the current sidelink grant; and transmitting the second transport block in the first hybrid automatic repeat request process.

In some embodiments, the method further comprises, in response to the current new data indicator matching the last received new data indicator, determining whether a positive acknowledgement has been transmitted in response to the last received sidelink grant.

In various embodiments, the method further comprises, in response to determining that the positive acknowledgement has been transmitted in response to the last received sidelink grant: considering the new data indicator as toggled; generating the second transport block for the first hybrid automatic repeat request process according to the current sidelink grant; and transmitting the second transport block in the first hybrid automatic repeat request process.

In one embodiment, the method further comprises, in response to determining that the negative acknowledgement has been transmitted in response to the last received sidelink grant: performing a hybrid automatic repeat request retransmission of the first transport block stored in a hybrid automatic repeat request buffer for the first hybrid automatic repeat request process.

In one embodiment, an apparatus comprises: a processor that: determines whether a current new data indicator in a current sidelink grant matches a last received new data indicator in a last received sidelink grant for a first hybrid automatic repeat request process; and, in response to determining that the current new data indicator does not match the last received new data indicator, determines whether a negative acknowledgement has been transmitted in response to the last received sidelink grant.

In certain embodiments, the processor, in response to determining: that the negative acknowledgement has been transmitted in response to the last received sidelink grant; and that the current new data indicator does not match the last received new data indicator for the first hybrid automatic repeat request process; switches from a first mode to a second mode for the first hybrid automatic repeat request process.

In some embodiments, the processor, in response to determining: that the negative acknowledgement has been transmitted in response to the last received sidelink grant; and that the current new data indicator does not match the last received new data indicator for the first hybrid automatic repeat request process; generates an autonomous hybrid automatic repeat request retransmission for a first transport block transmitted based on the last received sidelink grant.

In various embodiments, the apparatus further comprises a transmitter, wherein, in response to determining: that the negative acknowledgement has been transmitted in response to the last received sidelink grant; and that the current new data indicator does not match the last received new data indicator for the first hybrid automatic repeat request process; the processor selects a second hybrid automatic repeat request process from a plurality of available hybrid automatic repeat request processes; the processor generates a second transport block corresponding to the current sidelink grant; the processor stores the second transport block in a hybrid automatic repeat request buffer corresponding to the second hybrid automatic repeat request process; and the transmitter transmits the second transport block in the second hybrid automatic repeat request process.

In one embodiment, the processor, in response to determining: that the negative acknowledgement has been transmitted in response to the last received sidelink grant; and that the current new data indicator does not match the last received new data indicator for the first hybrid automatic repeat request process; ignores or skips the current sidelink grant and transmitting a positive acknowledgment to a base station.

In certain embodiments, the apparatus further comprises a transmitter, wherein, in response to determining that a positive acknowledgement has been transmitted in response to the last received sidelink grant: the processor generates the second transport block corresponding to the current sidelink grant; and the transmitter transmits the second transport block in the first hybrid automatic repeat request process.

In some embodiments, in response to the current new data indicator matching the last received new data indicator, the processor determines whether a positive acknowledgement has been transmitted in response to the last received sidelink grant.

In various embodiments, the apparatus further comprises a transmitter, wherein, in response to determining that the positive acknowledgement has been transmitted in response to the last received sidelink grant: the processor considers the new data indicator as toggled; the processor generates the second transport block for the first hybrid automatic repeat request process according to the current sidelink grant; and the transmitter transmits the second transport block in the first hybrid automatic repeat request process.

In one embodiment, in response to determining that the negative acknowledgement has been transmitted in response to the last received sidelink grant: the processor performs a hybrid automatic repeat request retransmission of the first transport block stored in a hybrid automatic repeat request buffer for the first hybrid automatic repeat request process.

In one embodiment, a method comprises: determining whether a current new data indicator in a current sidelink grant matches a last received new data indicator in a last received sidelink grant for a first hybrid automatic repeat request process; and, in response to determining that the current new data indicator matches the last received new data indicator, determining whether a positive acknowledgement has been transmitted in response to the last received sidelink grant.

In certain embodiments, the method further comprises, in response to determining: that the positive acknowledgement has been transmitted in response to the last received sidelink grant; and that the current new data indicator matches the last received new data indicator for the first hybrid automatic repeat request process; considering the new data indicator as toggled.

In some embodiments, the method further comprises generating a second transport block for the first hybrid automatic repeat request process according to the current sidelink grant.

In various embodiments, the method further comprises transmitting the second transport block in the first hybrid automatic repeat request process.

In one embodiment, the method further comprises, in response to determining that a negative acknowledgement has been transmitted in response to the last received sidelink grant: performing a hybrid automatic repeat request retransmission of a first transport block stored in a hybrid automatic repeat request buffer for the first hybrid automatic repeat request process.

In certain embodiments, the method further comprises, in response to the current new data indicator not matching the last received new data indicator, determining whether a negative acknowledgement has been transmitted in response to the last received sidelink grant.

In some embodiments, the method further comprises, in response to determining that the negative acknowledgement has been transmitted in response to the last received sidelink grant: switching from a first mode to a second mode for the first hybrid automatic repeat request process; generating an autonomous hybrid automatic repeat request retransmission for a first transport block transmitted based on the last received sidelink grant; selecting a second hybrid automatic repeat request process from a plurality of available hybrid automatic repeat request processes; generating a second transport block corresponding to the current sidelink grant; storing the second transport block in a hybrid automatic repeat request buffer corresponding to the second hybrid automatic repeat request process; and transmitting the second transport block in the second hybrid automatic repeat request process.

In various embodiments, the method further comprises, in response to determining that the positive acknowledgement has been transmitted in response to the last received sidelink grant: generating a second transport block corresponding to the current sidelink grant; and transmitting the second transport block in the first hybrid automatic repeat request process.

In one embodiment, an apparatus comprises: a processor that: determines whether a current new data indicator in a current sidelink grant matches a last received new data indicator in a last received sidelink grant for a first hybrid automatic repeat request process; and, in response to determining that the current new data indicator matches the last received new data indicator, determines whether a positive acknowledgement has been transmitted in response to the last received sidelink grant.

In certain embodiments, the processor, in response to determining: that the positive acknowledgement has been transmitted in response to the last received sidelink grant; and that the current new data indicator matches the last received new data indicator for the first hybrid automatic repeat request process; considers the new data indicator as toggled.

In some embodiments, the processor generates a second transport block for the first hybrid automatic repeat request process according to the current sidelink grant.

In various embodiments, the apparatus further comprises a transmitter that transmits the second transport block in the first hybrid automatic repeat request process.

In one embodiment, the processor, in response to determining that a negative acknowledgement has been transmitted in response to the last received sidelink grant: performs a hybrid automatic repeat request retransmission of a first transport block stored in a hybrid automatic repeat request buffer for the first hybrid automatic repeat request process.

In certain embodiments, the processor, in response to the current new data indicator not matching the last received new data indicator, determines whether a negative acknowledgement has been transmitted in response to the last received sidelink grant.

In some embodiments, the apparatus further comprises a transmitter, wherein, in response to determining that the negative acknowledgement has been transmitted in response to the last received sidelink grant: the processor switches from a first mode to a second mode for the first hybrid automatic repeat request process; the processor generates an autonomous hybrid automatic repeat request retransmission for a first transport block transmitted based on the last received sidelink grant; the processor selects a second hybrid automatic repeat request process from a plurality of available hybrid automatic repeat request processes; the processor generates a second transport block corresponding to the current sidelink grant; the processor stores the second transport block in a hybrid automatic repeat request buffer corresponding to the second hybrid automatic repeat request process; and the transmitter transmits the second transport block in the second hybrid automatic repeat request process.

In various embodiments, the apparatus further comprises a transmitter, wherein, in response to determining that the positive acknowledgement has been transmitted in response to the last received sidelink grant: the processor generates a second transport block corresponding to the current sidelink grant; and the transmitter transmits the second transport block in the first hybrid automatic repeat request process.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining whether a current new data indicator in a current sidelink grant matches a last received new data indicator in a last received sidelink grant for a first hybrid automatic repeat request process;
   in response to determining that the current new data indicator matches the last received new data indicator, determining whether a first positive acknowledgement has been transmitted in response to the last received sidelink grant; and in response to determining that the first positive acknowledgement has been transmitted in response to the last received sidelink grant;

ignoring the current sidelink grant by skipping the current sidelink grant; and transmitting a second positive acknowledgment.

2. The method of claim 1, further comprising, in response to determining:

that a negative acknowledgement has been transmitted in response to the last received sidelink grant; and that the current new data indicator does not match the last received new data indicator for the first hybrid automatic repeat request process;

switching from a first mode to a second mode for the first hybrid automatic repeat request process.

3. The method of claim 1, further comprising, in response to determining:

that a negative acknowledgement has been transmitted in response to the last received sidelink grant; and that the current new data indicator does not match the last received new data indicator for the first hybrid automatic repeat request process;

generating an autonomous hybrid automatic repeat request retransmission for a first transport block transmitted based on the last received sidelink grant.

4. The method of claim 1, further comprising, in response to determining:

that a negative acknowledgement has been transmitted in response to the last received sidelink grant; and that the current new data indicator does not match the last received new data indicator for the first hybrid automatic repeat request process;

selecting a second hybrid automatic repeat request process from a plurality of available hybrid automatic repeat request processes;

generating a second transport block corresponding to the current sidelink grant;

storing the second transport block in a hybrid automatic repeat request buffer corresponding to the second hybrid automatic repeat request process; and transmitting the second transport block in the second hybrid automatic repeat request process.

5. The method of claim 1, further comprising, in response to determining:

that a negative acknowledgement has been transmitted in response to the last received sidelink grant; and that the current new data indicator does not match the last received new data indicator for the first hybrid automatic repeat request process;

ignoring or skipping the current sidelink grant and transmitting a positive acknowledgment to a base station.

6. The method of claim 1, further comprising, in response to determining that the first positive acknowledgement has been transmitted in response to the last received sidelink grant:

generating a second transport block corresponding to the current sidelink grant; and transmitting the second transport block in the first hybrid automatic repeat request process.

7. The method of claim 1, further comprising, in response to determining that a negative acknowledgement has been transmitted in response to the last received sidelink grant:

performing a hybrid automatic repeat request retransmission of a first transport block stored in a hybrid automatic repeat request buffer for the first hybrid automatic repeat request process.

8. An apparatus comprising:

a processor that:

determines whether a current new data indicator in a current sidelink grant matches a last received new data indicator in a last received sidelink grant for a first hybrid automatic repeat request process;

in response to determining that the current new data indicator matches the last received new data indicator, determines whether a first positive acknowledgement has been transmitted in response to the last received sidelink grant; and in response to determining that the first positive acknowledgement has been transmitted in response to the last received sidelink grant;

ignores the current sidelink grant by skipping the current sidelink grant; and transmits a second positive acknowledgment.

9. The apparatus of claim 8, wherein the processor, in response to determining:

that a negative acknowledgement has been transmitted in response to the last received sidelink grant; and that the current new data indicator does not match the last received new data indicator for the first hybrid automatic repeat request process;

switches from a first mode to a second mode for the first hybrid automatic repeat request process.

10. A method comprising:

determining whether a current new data indicator in a current sidelink grant matches a last received new data indicator in a last received sidelink grant for a first hybrid automatic repeat request process; and in response to determining that the current new data indicator matches the last received new data indicator, determining whether a positive acknowledgement has been transmitted in response to the last received sidelink grant.

11. The method of claim 10, further comprising, in response to determining:

that the positive acknowledgement has been transmitted in response to the last received sidelink grant; and that the current new data indicator matches the last received new data indicator for the first hybrid automatic repeat request process;

considering the new data indicator as toggled.

12. The method of claim 11, further comprising generating a second transport block for the first hybrid automatic repeat request process according to the current sidelink grant.

13. The method of claim 12, further comprising transmitting the second transport block in the first hybrid automatic repeat request process.

14. The method of claim 10, further comprising, in response to determining that a negative acknowledgement has been transmitted in response to the last received sidelink grant:

performing a hybrid automatic repeat request retransmission of a first transport block stored in a hybrid automatic repeat request buffer for the first hybrid automatic repeat request process.

15. The method of claim 10, further comprising, in response to the current new data indicator not matching the last received new data indicator, determining whether a negative acknowledgement has been transmitted in response to the last received sidelink grant.

16. The method of claim 15, further comprising, in response to determining that the negative acknowledgement has been transmitted in response to the last received sidelink grant:
- switching from a first mode to a second mode for the first hybrid automatic repeat request process;
- generating an autonomous hybrid automatic repeat request retransmission for a first transport block transmitted based on the last received sidelink grant;
- selecting a second hybrid automatic repeat request process from a plurality of available hybrid automatic repeat request processes;
- generating a second transport block corresponding to the current sidelink grant;
- storing the second transport block in a hybrid automatic repeat request buffer corresponding to the second hybrid automatic repeat request process; and
- transmitting the second transport block in the second hybrid automatic repeat request process.

17. The method of claim 15, further comprising, in response to determining that the positive acknowledgement has been transmitted in response to the last received sidelink grant:
- generating a second transport block corresponding to the current sidelink grant; and
- transmitting the second transport block in the first hybrid automatic repeat request process.

18. An apparatus comprising:
a processor that:
- determines whether a current new data indicator in a current sidelink grant matches a last received new data indicator in a last received sidelink grant for a first hybrid automatic repeat request process; and
- in response to determining that the current new data indicator matches the last received new data indicator, determines whether a positive acknowledgement has been transmitted in response to the last received sidelink grant.

* * * * *